United States Patent [19]

Hobock et al.

[11] Patent Number: 5,042,319
[45] Date of Patent: Aug. 27, 1991

[54] SPLIT BEARING ECCENTRIC DRIVE

[75] Inventors: Edgar G. Hobock, Madera; Douglas K. Frotzmann, Kingsburg, both of Calif.

[73] Assignee: Sun-Maid Growers of California, Kingsburg, Calif.

[21] Appl. No.: 495,816

[22] Filed: Mar. 16, 1990

[51] Int. Cl.$^5$ .............................................. G05G 1/00
[52] U.S. Cl. .................................... 74/570; 74/579 R
[58] Field of Search ................ 74/579 E, 579 R, 595, 74/594, 593, 596, 570, 571 R; 384/268, 270, 294, 457

[56] References Cited

U.S. PATENT DOCUMENTS

| | | | |
|---|---|---|---|
| 805,587 | 11/1905 | Skofsrud | 384/270 |
| 1,154,650 | 9/1915 | Moore | 384/270 X |
| 1,558,978 | 10/1925 | Grimes | 74/579 E X |
| 1,695,776 | 12/1928 | Nemec | 74/570 X |
| 1,742,513 | 1/1930 | Leonard | 384/457 |
| 1,813,276 | 7/1931 | Burtnett | 74/579 E X |
| 1,821,873 | 9/1931 | Best | 384/457 |
| 2,145,864 | 2/1939 | Denneen et al. | 74/579 E X |
| 2,399,889 | 5/1946 | Pittman | 384/268 |

FOREIGN PATENT DOCUMENTS 858341 12/1952 Fed. Rep. of Germany ...... 384/457

Primary Examiner—Rodney M. Lindsey
Attorney, Agent, or Firm—Townsend and Townsend

[57] ABSTRACT

Drive assemblies with two novel aspects are disclosed. According to one aspect, the drive assembly is an eccentric drive assembly which is comprised of a crankshaft with eccentric journals, a split bearing and a split housing to encircle and clamp on to the bearing. The housing is joined to a connecting rod with translates the rotation of the crankshaft into a reciprocating motion. The split character permits the bearing and housing to be opened for inspection and, if necessary, removed for repair or replacement by access through a direction transverse to the crankshaft, so that these functions can be performed without disturbing the crankshaft itself or any other units positioned on it. According to the second aspect, the housing and bearing are constructed in a manner which permits variation of the housing position along the direction of the crankshaft axis with a clamping capability at any selected position. This is achieved by a unique arrangement of opposing contacting surfaces on the bearing and housing.

2 Claims, 3 Drawing Sheets

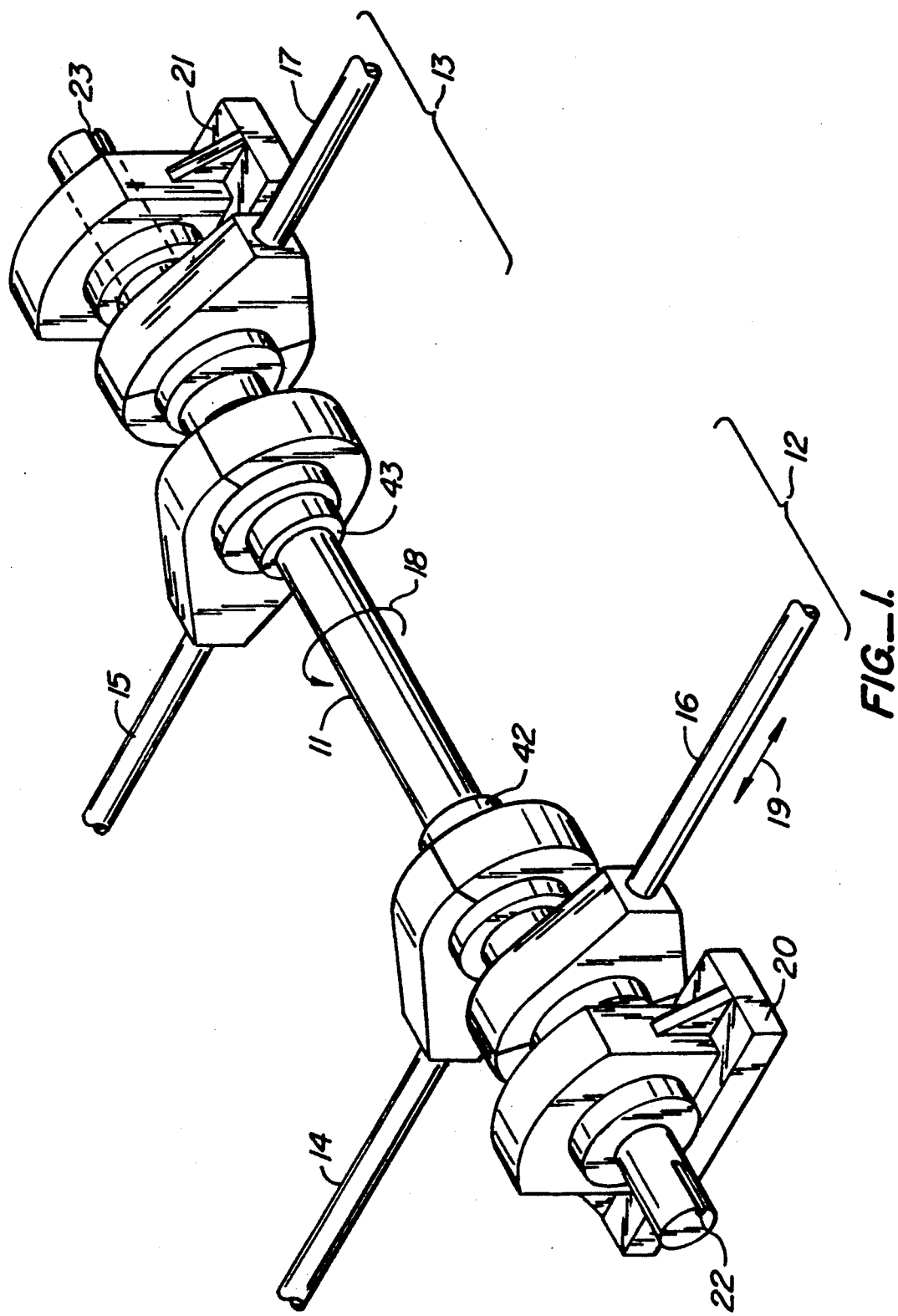
FIG._1.

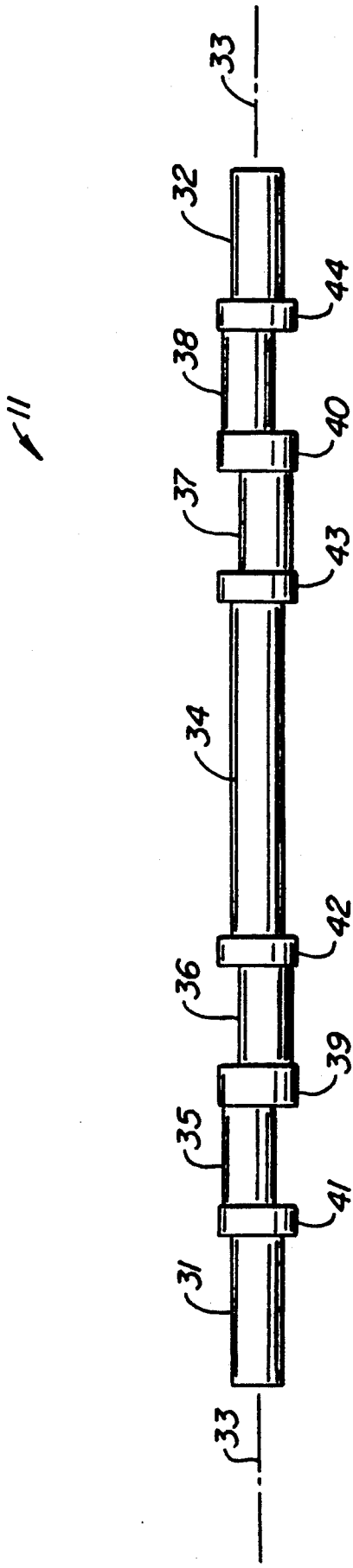
FIG._2.

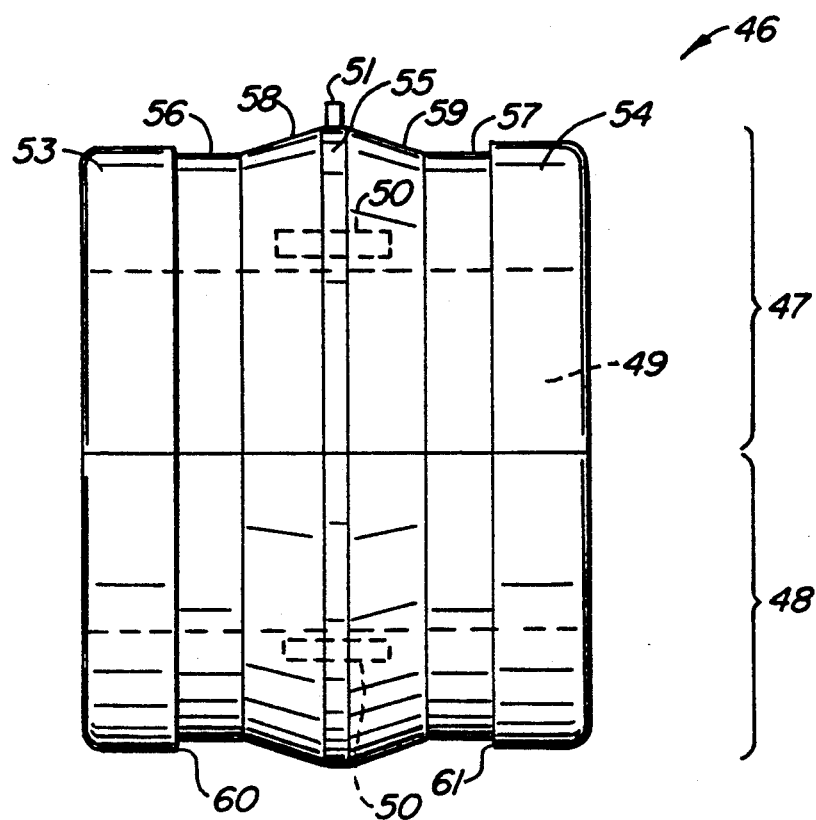
FIG._3.
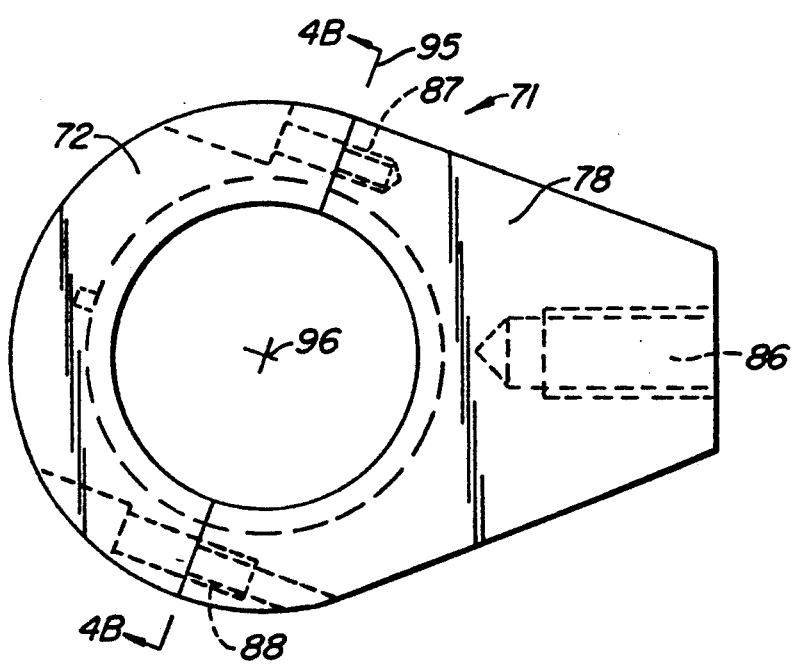
FIG._4A.
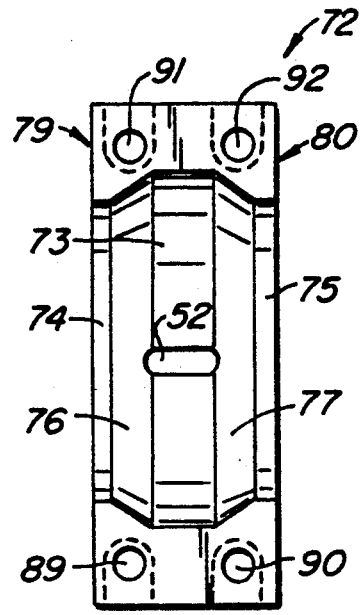
FIG._4B.

SPLIT BEARING ECCENTRIC DRIVE

This invention relates to bearing assemblies and drive systems, particularly reciprocating drive systems.

BACKGROUND AND SUMMARY OF THE INVENTION

Eccentric drive assemblies generally consist of a crankshaft, and eccentric ball-bearing journaled to the crankshaft, and a connecting rod extending from the bearing. The bearing is constructed of a center hub with an offset hole to receive the crankshaft, and a ring surrounding the hub with the balls separating the two, permitting rotation of one with respect to the other. The rod is secured to the ring, with the result that rotation of the crankshaft will result in reciprocating motion of the connecting rod.

Removal of the bearing for repair and replacement requires disconnecting the drive shaft from its mount and drive mechanisms, and drawing the bearing along the drive shaft in the axial direction to remove it. Additional units positioned on the crankshaft along the way must also be removed. When the drive assembly is the drive for a reciprocating conveyor, it is also necessary to completely remove the entire assembly from the conveyor. Depending on the size of the conveyor and assembly, this will generally require at least two workers, and four to six hours to perform the repair and replacement. When multiple units are driven by a single crankshaft, the need to dismount the crankshaft frequently requires that all such units be disconnected, even if only one needs repair. Overall production costs therefore must include considerable allowances for downtime, man-hours for removal, replacement and repair.

A drive assembly has now been developed which addresses these problems, and provides novel features of independent significance as well. In one aspect, the present invention provides a crankshaft and bearing assembly which permits removal of the bearing in, and replacement from, a direction transverse to the axis of the crankshaft, avoiding the necessity of disengaging the crankshaft from its mount, as well as all other disruptions and disconnections which occur while this is being done. This is accomplished by a crankshaft having an offset journal, in combination with a noneccentric bearing which is split in directions parallel to the crankshaft axis, permitting the bearing to be opened and removed from the journal in a direction transverse to the axis. Secured around the bearing is a housing to which the connecting rod is joined, the housing likewise being split to permit opening and removal in a direction transverse to the crankshaft axis. The split construction and transverse removal capability of the bearing and housing permit both to be removed from the journal without disturbing any other units on the crankshaft, and without demounting or disengaging the crankshaft itself in any manner other than to interrupt the crankshaft rotation. Removal and servicing of the bearing and housing can likewise be performed without disturbing the unit being driven, an example of such unit being a reciprocating conveyor. Roller-type bearings are particularly advantageous as split bearings, since they entail less friction and offer a longer useful life than ball bearings. With the lack of a central hub, the number of parts is reduced, thereby simplifying and reducing maintenance, as well as improving the ability of the operator to inspect bearings for wear.

In another aspect, the assembly is provided with the capability of adjusting the position of the housing and therefore the connecting rod along the axial direction of the crankshaft within a specified range, without disturbing the position of the bearing on the crankshaft. This is accomplished by mating cylindrical surfaces on the bearing and housing, parallel to the bearing bore. The mating surfaces and the contours adjacent to them are configured in such a way that one of these surfaces ca be slid axially along the other prior to the housing being rigidly clamped over the bearing. The clamping mechanism then secures the opposing surfaces against each other at the selected position. This permits an adjustment of the position of the housing along the crankshaft axis without adjustment of the bearing. This is of particular value in aligning the housing or a plurality of housings similarly constructed with the machinery to be driven by the connecting rods.

The preferred housing is one which is split along planes parallel to the bearing bore (and hence the crankshaft axis), to form two arc-shaped parts which when closed encircle the bearing. The cylindrical surface in the housing in these preferred embodiments will therefore consist of two arc-shaped parts which, when joined to the outward-facing cylindrical surface on the bearing exterior completely encircle the bearing except for a slight gap which permits clamping force to be applied. Preferred assemblies will have at least two pairs of mated cylindrical surfaces, while further preferred structures will contain other mated surfaces such as frustoconical surface sections.

Further features, advantages, and embodiments of the invention in each of its aspects will be apparent from the description which follows.

BRIEF DESCRIPTION OF THE DRAWINGS

Fig. 1 is a perspective view of a split bearing eccentric drive, as one embodiment of the present invention.

Fig. 2 is a side view of the crankshaft included in the drive ass shown in FIG. 1.

FIG. 3 is a side view, taken along the radial direction, of one bearing taken from the assembly of FIG. 1.

Fig. 4a is a side view, taken along the axial direction of one of the housings included in the drive assembly of FIG. 1.

Fig. 4b is a view of one part of the housing shown in FIG. 4a, taken along the line B—B thereof.

DETAILED DESCRIPTION OF THE INVENTION AND PREFERRED EMBODIMENTS

The construction shown in the drawings represents a single embodiment of the various concepts of the invention, and will serve as a basis for a description of the invention as a whole.

Beginning with FIG. 1, an eccentric drive assembly is shown. The drive assembly includes a crankshaft 11 and two pairs 12, 13 of opposing eccentric journal units. Each journal unit is connected to a connecting rod 14, 15, 16, 17 to which the rotation of the crankshaft is translated as reciprocating motion. For clarity, the rotation of the crankshaft is indicated by the arrow 18, and the reciprocating motion of the connecting rod is shown by the arrow 19 referring to connecting rod 16. The crankshaft itself is mounted at each end on mountings 20, 21, through split bearings which permit rotation. Keyways 22, 23 are cut into each end of the crankshaft 11 to permit attachment to pulleys, fly wheels, or any other conventional drive connecting component for a crankshaft.

Turning next to FIG. 2, the crankshaft 11 is shown, stripped of all bearings, units and other components. The two end sections 31, 32 of the crankshaft define a center line 33. A center section 34, which represents the section adjoining the 2 journal unit pairs 12, 13 is also coaxial with the center line 33. Each of these sections is of circular cross section.

The journals 35, 36, 37, 38 which support the bearings in the journal units are likewise of circular cross section, but are offset from the center line 33. Within each pair of journals, the two journals are offset in different directions or to different degrees in order to translate into a reciprocating motion of the connecting rods. Preferably, the journals are offset in opposing directions from the center line 33, and most preferably, by the same distance. Flanges 39, 40 separate the journals in each pair from each other, whereas outer flanges 41, 42, 43, 44 separate each journal from the adjacent crankshaft section. These flanges facilitate the positioning of the bearings on the crankshaft and help prevent axial slippage.

Turning next to FIGS. 3, 4a and 4b, one bearing and one housing can be seen in detail. The bearing 46 is shown in FIG. 3. The bearing is split into top and bottom halves 47, 48, which fit together in the same manner as any conventional split bearing cartridge. The bore 49 of the bearing is shown in dashed lines, as are the rollers 50. While ball bearings or roller bearings may be used, roller bearings as shown are preferred. The rollers ride along a circular race (not shown) which forms the lining of the bore and contacts the crankshaft journal. All internal parts of the bearing, including the roller support and race, are split in the same manner as the exterior. The bearing has a retaining pin 51 protruding from its exterior, to mate with a keyway 52 in the housing, as illustrated in FIG. 4b. This prevents the bearing cartridge from spinning in the housing 71.

The housing 71 shown in FIG. 4a encircles the bearing 46, covering all external surfaces shown in FIG. 3 except for the two end hubs 53, 54. The housing thus covers a central cylindrical section 55 of the bearing's outer surface, two additional cylindrical sections 56, 57 on either side of the central cylindrical surface 55 and of lesser diameter, and two frustoconical sections 58, 59 joining the central cylindrical section to each of the two side cylindrical sections.

The opposing surfaces in the interior of the housing 71 can be seen in FIG. 4b, which shows one section 72 of the two sections of the split housing 71. The internal surface facing the central cylindrical surface 55 of the bearing is an inward-facing cylindrical surface 73. The two side cylindrical surfaces 74, 75 oppose the side cylindrical surfaces 56, 57 of the bearing. Two frustoconical surfaces 76, 77 join the two side cylindrical surfaces 74, 75, respectively, to the central cylindrical surface 73, and face the similar frustoconical surfaces 58, 59 on the bearing 46. The keyway 52 for the retaining pin 51 is an elongated recession in the central cylindrical surface 73.

It will be noted from a comparison of the drawings that the central cylindrical surface 73 on the housing interior is wider than the central cylindrical surface 55 on the bearing exterior, and that the side cylindrical surfaces 74, 75 on the housing interior are narrower than the corresponding side cylindrical surfaces 56, 57 on the bearing exterior. As a result, the frustoconical surfaces 58, 59 on the bearing exterior are closer together than the frustoconical surfaces 76, 77 on the housing interior. Otherwise, the frustoconical surfaces are at the same angle and same width, the two central cylindrical surfaces 55, 73 are of approximately the same diameter, and the side cylindrical surfaces 56, 57, 74, 75, are all of approximately the same diameter.

The internal surfaces of the housing part 72 shown in FIG. 4b are continued in the remaining housing part 78 shown in FIG. 4a to form substantially continuous surfaces when the two parts are joined. The width of each part of the housing 71, i.e., the distance between one end face 79 and the other 80 is less than the distance between the inner rims 60, 61 of the end hubs 53, 54 respectively of the bearing 46. This difference plus differences in the widths of the various opposing cylindrical sections permit the housing parts 72, 78 to be placed over the bearing 46 within a range of positions in the axial direction. Thus, the range of variability extends in the left-to-right direction in the view shown in FIG. 3. Depending on the relative widths of the surfaces, the limits of the range in either direction may be either the frustoconical surfaces or the inward-facing ledges 60, 61 along the inner rims of the end hubs 53, 54 of the bearing.

Once the desired position is selected and the two halves of the housing are positioned accordingly, they are tightened together to secure the housing immovably over the bearing. To permit a clamping force, one or more of the inner cylindrical surfaces 73, 74, 75 of the housing will be of slightly lesser diameter than the opposing cylindrical surface (55, 56, 57) on the bearing exterior. This will leave a slight gap between the two halves 72, 78 of the housing when encircling the bearing, permitting room for the clamping force to be applied.

Other features of the housing are a threaded hole 86 to receive the connecting rod, and threaded holes 87, 88 to receive bolts to hold the two halves 72, 78 of the housing together. In the embodiment shown in FIGS. 4a and 4b, four such threaded holes are included for holding the housing halves together, although only two are shown in FIG. 4a. The corresponding unthreaded holes 89, 90, 91, 92 for passage of the bolts are shown in FIG. 4b. The bolts themselves are not shown.

It should be understood that the terms "cylindrical surface" and "cylindrical section" refer to surfaces and sections of right circular cylinders, i.e., those with circular cross sections, and sides parallel to the cylinder axis. The term "frustoconical" refers to a truncated cone or section of a cone, terminated by planes perpendicular to the cone axis.

As stated above, the configurations shown in these drawings are merely illustrative of one embodiment of the invention. Other arrangements and combinations of surfaces which achieve a similar or equivalent result are likewise within the scope of the invention. With regard to the aspect of the invention involving the variable positioning of the housing with respect to the bearing, the critical features include at least one pair of opposing surfaces, and possibly two or more, which are in contact with and forced against each other by the clamping mechanism of the housing. These surfaces, either by differences in their width or by the arrangement of adjacent surfaces, imparting to the housing and bearing an axially directed degree of freedom. These cylindrical surfaces thereby provide both the adjustment capability and the grasping function which joins the housing to the bearing. The grasping function may also be served by other surfaces, such as frustoconical surfaces of the type shown, simultaneously with the cylindrical surfaces. In general, at most one pair of opposing frustoconical surfaces will be engaged at any one time, and then only if the housing is moved to the extreme limit of the range of motion at one end.

While the scope of the invention is broad and varied, certain arrangements and combinations of the surface sections are preferred. For example, structures which include two or more pairs of opposing cylindrical surface sections are preferred, the two sections on each surface separated by concave or convex surfaces (i.e., concave on one and convex on the other) and yet permitting the axial variability described above. The concave and convex surfaces are conveniently formed from frustoconical sections, two on each surface tapering in opposing directions and separated from each other by different distances, as for example by central cylindrical sections of different widths.

The preferred surface contours include three cylindrical segments on each surface, separated by two frustoconical surfaces tapering in opposite directions. In the arrangement shown in the drawings, the central cylindrical surface is of greater diameter than the outer two. The alternate arrangement may also be used, however, whereby the outer cylindrical surfaces are of greater diameter than the central cylindrical surface, and the adjoining frustoconical surfaces are reversed.

In embodiments of the invention focusing on the axial variability of the housing with respect to the bearing, it is preferred, as indicated above, that the clamping capability of the housing be achieved by the use of a split housing, i.e., a housing which is divided into two or more parts which can be drawn apart or otherwise separated sufficiently to remove the housing from the bearing in the direction transverse to the bearing bore. This is the configuration shown in FIG. 4a, in which the two parts are divided along a plane 95 which is parallel to and passes through the central axis 96 of the bore. Clamping by the use of a split housing is particularly preferred when a split bearing is used as well, as described above in connection with other aspects and embodiments of the invention. Other clamping and tightening methods, however, are within the scope of the invention. Conventional clamping structures and bolt arrangements well known among those skilled in machinery design may be used in place of the embodiment shown.

It will be noted from FIG. 4a that the plane 95 which divides the two halves 72, 78 of the housing is at an acute angle with respect to the axis of the threaded hole 86, rather than being perpendicular to the axis. This is a preferred design, since it provides an advantage to the operator who is assembling or disassembling the unit for purposes of inspection, removal or repair. With the split plane at an acute angle as shown, the half 78 of the housing to which the tie rod is attached (through the threaded hole 86) may be inverted and placed over the crankshaft journal where it can remain in a self supporting manner. The remaining half 72 of the housing can thus be removed and returned without any other means of holding the self supporting half in place. The inspection and repair procedure can thus be performed by a single operator.

As a further illustration of the invention, the following is a description of a unit representing a specific example within the scope of this invention.

The crankshaft in this example is made from stress-relieved cold roll shafting. Alternatively, it can be precast from cast iron or ductile iron, then machined to finished specifications. The shafting from which the crankshaft is cut is five inches in diameter, and the total length is seven feet. The crankshaft contains four bearing journals, in the arrangement shown in FIG. 2, in 2 pairs, 1 pair toward each end. The length of each journal is 5¾ (5.75) inches. The diameter of each of the journals, as well as each of the connecting crankshaft sections, is 2 15/16 (2.9375) inches. In each pair of journals, one journal of the pair is machined 0.5 inch offset from the shaft center line, and the other 0.5 inch offset in the opposite direction, creating a 1-inch throw between the journals.

The mounting bearings corresponding to elements 20 and 21 of FIG. 1 are split pillow block bearings, such as those manufactured by Cooper Bearing Company, Virginia Beach, Va., or equivalents. The bearings mounted to the offset journals are manufactured by modification of a Cooper split bearing cartridge. A typical such unit is a 2 15/16 (2.9375) inch unit. To achieve the shape shown in FIG. 3, the surface of the cartridge, which as supplied is spherical, is machined to form the surfaces 55–58 shown in the figure. The side cylindrical surfaces 56, 57 are approximately ¾ inch wide and 6⅜ (6.375) inches in diameter. The central cylindrical surface 55 is approximately 5/16 inch wide and 6 15/16 (6.9375) inches in diameter. The frustoconical surfaces 58, 59 are each at 18° angles with respect to the parallel surfaces of the cylindrical sections.

The housing, as shown in FIGS. 4a and 4b has a width of 3 inches between end faces 79 and 80, an internal diameter of 6 inches and an external diameter of 10 inches, and is split along plane 95 at an angle of 45° with respect to the axis of the threaded hole 86 for the connecting rod. The internal surfaces of the housing, as shown in FIG. 4b, include a central cylindrical surface 73 which is ¾ inch in width, and side cylindrical surfaces 74, 75 which are each ⅝ inch in width. The frustoconical surfaces 76, 77 are each at 18° with respect to the axis 96 of the housing. This allows for a relative positioning of the housing and bearing over a range of ⅝ inch in width. The clamping effect is achieved by using a slightly smaller diameter of the side cylindrical surfaces on the housing interior 74, 75 then the diameter of the corresponding surfaces 56, 57 on the bearing. In this particular example, the difference is 0.001 inch maximum, thereby permitting that much room for application of the clamping force.

The foregoing description is offered primarily for purposes of illustration. It will be readily apparent to those skilled in the art that variations, modifications and substitutions may be made in each of the components described herein without departing from the spirit and scope of the invention.

What is claimed is:

1. A drive assembly for joining a drive shaft to a transverse rod and capable of lateral adjustment, comprising:
   a bearing adapted to engage said drive shaft, said bearing having an axial bore and an outer surface;
   a housing sized to encircle said bearing and including means for attachment thereto of said transverse rod;

a first pair of outer cylindrical sections contained in said outer surface of said bearing parallel to said bore and an inner surface of said housing, respectively, and approximately equal in diameter to each other;

a second pair of outer cylindrical sections contained in said outer surface of said bearing and said inner surface of said housing, respectively; and a pair of central cylindrical sections contained in said outer surface of said bearing and said inner surface of said housing, respectively, separated from said outer cylindrical sections by frustoconical sections on each said surface, said central cylindrical sections and said frustoconical sections constructed and arranged to permit engagement of said first pair of outer cylindrical sections with each other, said second pair of outer cylindrical sections with each other, and said pair of central cylindrical sections with each other, each said pair at variable relative positions along the direction of said bore, and when so engaged to apply a clamping force against each other when said housing and bearing are engaged, said housing being constructed to be capable of being releasably tightened over said bearing to apply said clamping force.

2. A drive assembly in accordance with claim 1 in which said central cylindrical sections are of greater diameter than said outer cylindrical sections.

* * * * *

UNITED STATES PATENT AND TRADEMARK OFFICE
CERTIFICATE OF CORRECTION

PATENT NO. : 5,042,319
DATED : Aug. 27, 1991
INVENTOR(S) : Edgar G. Hobock et al.

It is certified that error appears in the above-identified patent and that said Letters Patent is hereby corrected as shown below:

Cover page, Section [75]: Change "Frotzmann" to

--Protzmann--.

Signed and Sealed this

Fifth Day of January, 1993

Attest:

DOUGLAS B. COMER

*Attesting Officer*   Acting Commissioner of Patents and Trademarks